United States Patent
Krieg (10) Patent No.: US 11,186,972 B2
(45) Date of Patent: Nov. 30, 2021

(54) ADJUSTABLE UNDERGROUND UTILITY BOXES WITH SHORTENING PREVENTION SLEEVES

(71) Applicant: Pamela Krieg, Kearny, NJ (US)

(72) Inventor: Pamela Krieg, Kearny, NJ (US)

( * ) Notice: Subject to any disclaimer, the term of this patent is extended or adjusted under 35 U.S.C. 154(b) by 0 days.

(21) Appl. No.: 16/924,936

(22) Filed: Jul. 9, 2020

(65) Prior Publication Data
US 2020/0347582 A1    Nov. 5, 2020

Related U.S. Application Data

(63) Continuation of application No. 15/964,043, filed on Apr. 26, 2018, now Pat. No. 10,711,441.

(60) Provisional application No. 62/490,274, filed on Apr. 26, 2017.

(51) Int. Cl.
| | |
|---|---|
| *F16L 15/00* | (2006.01) |
| *E03B 9/12* | (2006.01) |
| *F16K 27/00* | (2006.01) |
| *E03B 9/10* | (2006.01) |

(52) U.S. Cl.
CPC ........ *E03B 9/12* (2013.01); *E03B 9/10* (2013.01); *F16K 27/006* (2013.01); *Y10T 137/7017* (2015.04)

(58) Field of Classification Search
CPC .................. Y10T 137/6995; Y10T 137/7017
USPC ...................................... 220/8; 138/111–117
See application file for complete search history.

(56) References Cited

U.S. PATENT DOCUMENTS

| | | | | |
|---|---|---|---|---|
| 307,753 | A | ‡ 11/1884 | Earle ...................... | F16K 31/46 137/369 |
| 380,308 | A | ‡ 4/1888 | Barry, Jr. .................. | E03B 9/08 137/370 |
| 407,955 | A | ‡ 7/1889 | Kallaher at al. ........ | F16K 31/46 137/369 |
| 1,004,436 | A | ‡ 9/1911 | Kehr, Sr. ................... | E03B 9/10 137/366 |
| 1,325,393 | A | ‡ 12/1919 | Calhoun .................. | H02G 3/14 220/3.8 |
| 2,827,914 | A | ‡ 3/1958 | Alters ....................... | E03B 9/10 137/364 |
| 3,537,471 | A | ‡ 11/1970 | Houle ....................... | F16L 5/00 137/370 |
| 3,601,143 | A | ‡ 8/1971 | Glennon ............... | F16K 27/006 137/364 |

(Continued)

*Primary Examiner* — Robert K Arundale
(74) *Attorney, Agent, or Firm* — Heslin Rothenberg Farley & Mesiti P.C.; Kristian E. Ziegler, Esq.

(57) ABSTRACT

The present disclosure provides shortening prevention sleeves for adjustable underground utility boxes, underground utility boxes including such sleeves, and methods of preventing shortening of underground utility boxes with such sleeves. A sleeve comprises a substantially rigid elongate tube that defines an internal cavity. The tube is configured to allow a stem portion of an adjustable underground utility box to extend fully therethrough via the internal cavity. The sleeve also comprises an opening that extends along the length of the tube and provides a passageway into the internal cavity. The tube is configured to allow the stem portion of the box to pass through the opening and into the internal cavity. The sleeve is configured to extend over and along the stem portion and between enlarged top and bottom portions of the box to prevent the stem portion, and thereby the box as a whole, from shortening.

19 Claims, 4 Drawing Sheets

(56) References Cited

U.S. PATENT DOCUMENTS

| | | | | |
|---|---|---|---|---|
| 3,693,647 A ‡ | 9/1972 | Saar | .......................... | E03B 9/04 |
| | | | | 137/363 |
| 4,239,056 A ‡ | 12/1980 | Shope | ...................... | F16K 27/12 |
| | | | | 137/36 |
| 4,325,405 A ‡ | 4/1982 | Christo | ............... | E02D 29/1409 |
| | | | | 137/370 |
| 4,333,494 A ‡ | 6/1982 | Shope | ................... | F16K 27/006 |
| | | | | 137/36 |
| 5,220,942 A ‡ | 6/1993 | Garvin, Jr. | .......... | F16K 37/0008 |
| | | | | 116/277 |
| 5,634,488 A ‡ | 6/1997 | Martin, Jr. | ............ | F16L 59/168 |
| | | | | 137/364 |
| 5,738,140 A ‡ | 4/1998 | Mann | ....................... | E03B 9/10 |
| | | | | 116/227 |
| 5,803,125 A ‡ | 9/1998 | Bliss | ........................ | E03B 9/08 |
| | | | | 137/370 |
| 6,009,897 A ‡ | 1/2000 | Hill | .......................... | E03B 9/10 |
| | | | | 137/364 |
| 8,082,945 B1 ‡ | 12/2011 | White | ................... | F16K 27/006 |
| | | | | 139/369 |
| 2003/0230343 A1 ‡ | 12/2003 | Phipps | ...................... | E03B 9/08 |
| | | | | 137/364 |
| 2008/0023077 A1 ‡ | 1/2008 | Weisz | .................... | B25B 13/48 |
| | | | | 137/370 |
| 2009/0071205 A1 ‡ | 3/2009 | Agbay | ................... | F16K 35/10 |
| | | | | 70/169 |

‡ imported from a related application

ADJUSTABLE UNDERGROUND UTILITY BOXES WITH SHORTENING PREVENTION SLEEVES

CROSS-REFERENCE TO RELATED APPLICATION

This present application is a continuation application of U.S. patent application Ser. No. 15/964,403, filed on Apr. 26, 2018, entitled Adjustable Underground Utility Boxes with Shortening Prevention Sleeves, which perfected and claims the benefit of U.S. Provisional Patent Application No. 62/490,274, filed on Apr. 26, 2017, entitled No Slip Sleeve for Adjustable Underground Utility Boxes, the contents of which are hereby expressly incorporated herein by reference in their entireties.

TECHNICAL FIELD

This present disclosure relates generally to the field of adjustable underground utility boxes such as, for example, valve boxes, curb boxes, service boxes and test stations, and more specifically, to a no slip sleeve for adjustable underground utility boxes.

BACKGROUND OF THE INVENTION

Pipelines are used for transporting water, petroleum products, natural gas, and other utilities, such as electrical, telecommunications, fiber optics and other similar utilities. There exists a huge network of piping systems used in every country all over the world. In many cases, pipelines are buried underground and may include markers, indicators, valves or other aspects that need to be accessed, monitored or treated from above ground.

Some buried pipelines (e.g., pipelines formed from metallic or electrically conductive materials) or other structures are exposed to an electrochemical corrosion process underground. During this process, the pipeline becomes an electrode and the soil becomes an electrolyte such that an electrolytic cell is formed causing corrosion of the buried or underground pipeline structure. If this corrosion is not mitigated, dangerous and expensive damage can result.

There are several corrosion control techniques used on underground pipelines, including, for example, cathodic protection. A cathodic protection system may be used to measure the effectiveness of cathodic protection, and/or protect personnel from accidental contact with electrical terminals of test leads. In a typical cathodic protection system, a cathodic protection test station is used to protect the electrical leads and provide an indication to personnel where the system is located underground. A typical test station has top portion at or near the top surface of the ground, a cylindrical plastic reference tube extending downwardly though the ground (e.g., soil) to a bottom portion that is positioned underground near the protected structure, such as a pipe. The bottom portion may be electrically coupled to the protected structure, and the test station may also be electrically coupled to (and potentially include) a sacrificial metal that is more easily corroded than the protected structure to act as an anode during the electrochemical corrosion process (so as to make the protected structure a cathode to protect it from corrosion).

Figure 4:
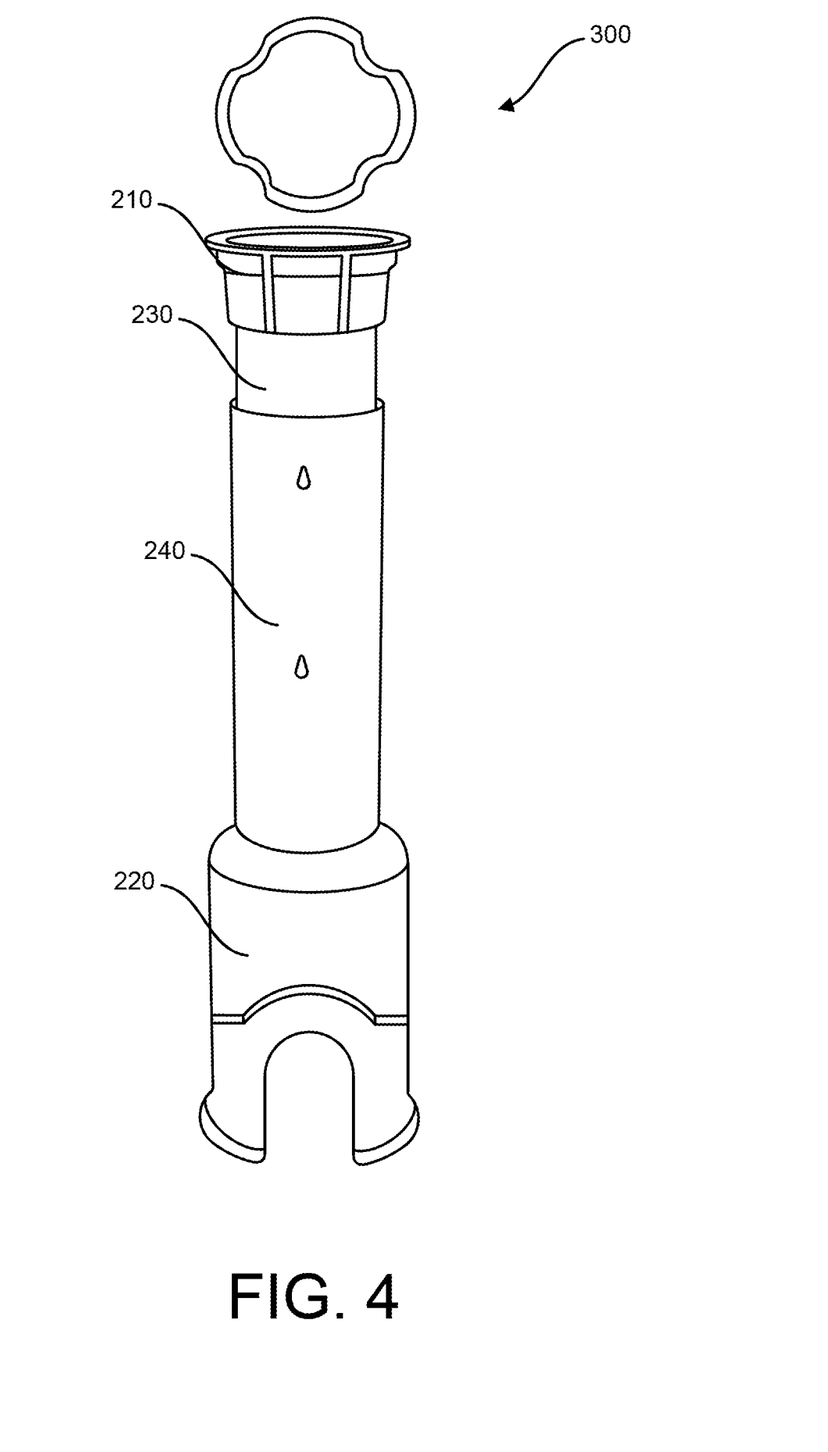
FIG. 4 depicts an exemplary embodiment of a prior art adjustable underground utility box.

Other pipelines include, for example, valves, such as a water or gas valve, positioned in line with a water or gas line (e.g., a main line). In this situation, a valve box may be used to protect the water or gas valve and provide an indication of and/or access thereto to personnel above ground of the location of the valve or other structure. A typical valve box 300, as illustrated in FIG. 4, has a base or bottom portion 220 that is positioned (e.g., centered) over or proximate to the operating nut of the valve (or other structure) within the ground, a top portion 210 with cover positioned flush or slightly below with the finished grade of the ground, and one or more stem portions 230, 240 extending between the top and bottom portions 210, 220. The valve box 300 is typically hollow, and the top portion 210 may include a cap or other removable top as shown in FIG. 4, so as to provide access through the valve box to the underground structure.

During installation, the top portion 210 of such a valve box 300 is adjusted for elevation while the base or bottom portion 220 is centered over the pipe or other structure (e.g. over an operating nut and/or valve, for example). Proper alignment and height or length of, for example, a valve box 300 must be maintained. With both valve boxes and test stations, the distance between the top 210 and bottom 220 portions are sometimes adjustable by, for example, the use of rigid fixed length extension or stem pieces coupled in an adjustable arrangement. For example, as shown in FIG. 4 a typical valve box 300 may include a first stem portion 230 that extends from the top portion 210, and a second stem portion 240 that extends from the bottom portion 220. As shown in FIG. 4, the first stem portion 230 and the top portion 210 may be integral or of one-piece construction or fixedly coupled together, and the second stem portion 240 and the bottom portion 220 may be integral or of one-piece construction or fixedly coupled together. The adjustable arrangement of the valve box 300 may be, for example, provided by a screw or slip adjustment configuration or mechanism between the first and second stem portions 230, 240 where one stem is telescopically received by the other stem such that the overall distance between the top 210 and bottom 220 portions is altered by altering the physical relationship (e.g., rotational/angular and/or axial relationship) between the first and second stem portions 230, 240. In another embodiment, the first and second stem portions 230, 240 may be threadably coupled. However, the box 300 may include any other adjustable coupling mechanisms or configurations that allow the total height/length of the first and second portions 230, 240 to be adjusted or changed.

During current installation of typical underground utility boxes, the distance between the top 210 and bottom 220 portions thereof is typically adjusted while at least one portion of the box 300 is installed in the ground. For example, the bottom or base portion 220 of a box 300 is typically translated into the ground and set over the valve/ valve nut or other underground structure as a first step of installation. With the bottom portion 220 over or proximate to the underground structure, an installer typically fits or coupled the first and second stem portions 230, 240 together, while, at the same time, adjusting the stem portions 230, 240 to arrive at the desired distance between the top 210 and bottom 220 portions. This process is a cumbersome task, especially considering the size and weight (e.g., cast iron components) of some boxes 300. For example, relatively large underground utility boxes may include twenty-pound casting components or portions (or as a whole) that may take several attempts at fitting/adjusting to achieve the correct height/length of the box.

Over time, underground utility boxes, such as but not limited to valve boxes, test stations, curb boxes and other devices or applications that use adjustably-coupled stem portions, tend to slip, adjust or sink further into the ground than as compared to when originally installed, such as due to temperature fluctuations, ground settling, road variation, vibrations, or other circumstances. Such events typically occur over time, but may occur during initial installation. The slipping or sinking of an underground utility box into the ground can cause pot holes or depressions in the top surface of the ground—which occurs often on busy highways or roads. Further, an existing underground utility box that requires replacement (e.g., due to damage or an inability to be sufficiently adjusted (e.g., fails to include enough height/length travel or adjustability)) to prevent and/or address a depression at finished grade caused by sinking of at least the top portion 210 thereof, must be removed and replaced with a new underground utility box assembly, which could be a costly procedure.

While certain aspects of conventional technologies have been discussed to facilitate disclosure of the disclosure, Applicant in no way disclaims these technical aspects, and it is contemplated that the claimed disclosure may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present disclosure satisfies the need for underground utility boxes that do not create depressions at grade level and/or require full removal for replacement and/or grade level depression prevention and/or repair. The present disclosure may address one or more of the problems and deficiencies of the art discussed above. However, it is contemplated that the disclosure may prove useful in addressing other problems and deficiencies in a number of technical areas. Therefore, the claimed disclosure should not necessarily be construed as limited to addressing any of the particular problems or deficiencies discussed herein.

Certain embodiments of the presently-disclosed underground utility boxes, non-adjustable sleeves for underground utility boxes and related methods for making, repairing and/or replacing underground utility boxes have several features, no single one of which is solely responsible for their desirable attributes. Without limiting the scope of the underground utility boxes, sleeves for underground utility boxes and related methods as disclosed herein and defined by the claims that follow, their more prominent features will now be discussed briefly. After considering this discussion, and particularly after reading the section of this specification entitled "Detailed Description of the Disclosure," one will understand how the features of the various embodiments disclosed herein provide a number of advantages over the current state of the art.

The shortcomings of the prior art may be alleviated by adjustable underground utility boxes that include a no slip, shortening prevention/preventing, non-adjustable or fixed-length/height sleeve constructed in accordance with one or more aspects of the present disclosure. The non-adjustable sleeves may be used with adjustable underground utility boxes such as, for example, valve boxes, test stations, service boxes and curb boxes. The non-adjustable sleeve provides a precise installation process by eliminating any awkward or cumbersome slippage or adjustment of, for example, two adjustable stem portions of an adjustable underground utility box during installation. The non-adjustable sleeve may also lessen chances of dropping, breaking, or putting together an adjustable utility box in a ditch/hole. Still further, the non-adjustable sleeve prevents sinkage, slippage, adjustment or other movement of the top portion of underground utility boxes into the ground subsequent to initial installation. Additionally, other uses may be made of the inventions provided by this disclosure that fall within the scope of the claimed invention but which are not specifically described below.

Additional features and benefits will become apparent from the following drawings and descriptions of the present disclosure. Other embodiments and aspects of inventions of the present disclosure are described in detail herein and are considered a part of the claimed inventions.

In one aspect, the present disclosure provides a method of preventing shortening of an adjustable underground utility box. The method comprises adjusting the length of a stem portion of a utility box to adjust the distance between top and bottom portions of the utility box such that when the bottom portion is positioned underground at or proximate to an underground structure the top portion is positioned at or proximate to a top surface of the ground. The method further comprises coupling a substantially rigid sleeve to the stem portion such that the sleeve extends between the top and bottom portions of the utility box to prevent the stem portion from shortening the distance between the top and bottom portions.

In some embodiments, the sleeve prevents movement of the top portion of the utility box toward the bottom portion and the underground structure when the bottom portion is positioned underground at or proximate to the underground structure. In some embodiments, the method further comprises positioning the bottom portion of the utility box underground at or proximate to the underground structure such that the top portion of the utility box is positioned at or proximate to the top surface of the ground. In some such embodiments, the sleeve is coupled to the stem portion prior to the bottom portion being positioned underground at or proximate to the underground structure. In some other embodiments, the bottom portion is positioned underground at or proximate to the underground structure prior to the sleeve being coupled to the stem portion.

In some embodiments, the sleeve comprises an elongate tube member that defines an internal cavity that extends through the tube, and coupling the sleeve to the stem portion comprises positioning the stem portion within the internal cavity. In some such embodiments, the tube member comprises an opening that extends along the entirety of the length of the tube member, and positioning the stem portion within the internal cavity comprises passing the stem portion through the opening. In some embodiments, adjusting the length of a stem portion comprises adjusting a connection between a first stem portion extending from the top portion and a second stem portion extending from the bottom portion.

In another aspect, the present disclosure provides a sleeve for an adjustable underground utility box. In some embodiments, the sleeve comprises a substantially rigid tube member that is elongated along a height direction and defines an internal cavity that extends through the tube along the height direction and an opening that extends along the entirety of the tube member along the height direction and is in communication with the internal cavity. The tube member is configured to couple to a length adjustable stem portion that extends between bottom and top portions of an adjustable underground utility box along the height direction such that the stem portion extends through the internal cavity and the tube member extends between the top and bottom portions to prevent the distance between the top and bottom portions along the height direction from shortening.

In another aspect, the present disclosure provides and underground utility box. The utility box comprises a top portion configured to be positioned at or proximate to a top surface of a ground when the box is installed, and an elongate first sleeve portion extending from the top portion along a height direction. The utility box further comprises a bottom portion configured to be positioned underground at or proximate to an underground structure when the box is installed, and a second sleeve portion extending the bottom portion along the height direction. The utility box also comprises a stem portion extending between the top and bottom portions along the height direction. The length of the stem portion along the height direction is adjustable to adjust the distance between the top and bottom portions along the height direction and thereby the total height of the box. The utility box further comprises a substantially rigid sleeve extending between the top and bottom portions that prevents the stem portion from shortening the distance between the top and bottom portions along the height direction and thereby the shortening of the total height of the box.

In some embodiments, the sleeve comprises a tube member that is elongated along the height direction and defines an internal cavity that extends through the tube along the height direction. In some such embodiments, the stem portion extends through the internal cavity such that the tube member extends about the stem portion. In some such embodiments, the tube member comprises an opening that extends along the entirety of the length of the tube member along the height direction, and sleeve is configured to allow the stem portion to pass through the opening of the tube member. In some such embodiments, a width of the opening of the tube member is equal to or greater than a width of the stem portion. In some other such embodiments, a width of the opening of the tube member is less than a width of the stem portion, and the tube member is deformable to widen the opening to a width that is equal to or greater than the width of the stem portion.

In some embodiments, the sleeve allows the stem portion to lengthen the distance between the top and bottom portions along the height direction and thereby the lengthen of the total height of the box. In some embodiments, the stem portion comprises a first stem portion extending from the top portion toward the bottom portion along the height direction, and a second stem portion extending from the bottom portion toward the top portion along the height direction. In some such embodiments, the first and second stem portions are telescopically coupled or threadably to provide the height adjustability of the sleeve.

In some embodiments, the top portion, the stem portion and the bottom portion form an internal passageway that provides access to the underground structure from above the ground. In some embodiments, the utility box further comprises a sacrificial metal material electrically coupled to the underground structure that is more easily corroded by an electrochemical corrosion process than the underground structure to protect the underground structure from corrosion.

BRIEF DESCRIPTION OF THE DRAWINGS

The subject matter which is regarded as inventions is particularly pointed out and distinctly claimed in the claims at the end of the specification. The foregoing and other objects, features, and advantages of the present disclosure are apparent from the following detailed description taken in conjunction with the accompanying drawings in which:

DETAILED DESCRIPTION OF EMBODIMENTS OF THE INVENTION

Aspects of the present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the disclosure in detail. It should be understood, however, that the detailed description and the specific example(s), while indicating embodiments of the disclosure, are given by way of illustration only, and are not by way of limitation. Various substitutions, modifications, additions and/or arrangements within the spirit and/or scope of the underlying concepts will be apparent to those skilled in the art from this disclosure.

Reference will be made below in detail to exemplary embodiments of the disclosure, examples of which are illustrated in the accompanying drawings. Wherever possible, the same reference numerals used throughout the drawings refer to the same or like aspects.

For the purposes of promoting an understanding of the principles of a no slip, shortening prevention/preventing, non-adjustable or fixed-length/height sleeve, and underground utility boxes and related methods including such a sleeve, designed and constructed in accordance with one or more aspects of the present disclosure, reference will now be made to the embodiments, or examples, illustrated in the drawings and specific language will be used to describe these. It will nevertheless be understood that no limitation of the scope of any invention provided herein is thereby intended. Any alterations and further modifications in the described embodiments, and any further applications of the principles of the present disclosure as described herein are contemplated as would normally occur to one skilled in the art to which the no slip, shortening prevention/preventing, non-adjustable or fixed-length/height sleeves and underground utility boxes and related methods incorporating such sleeves relates.

A no slip, shortening prevention/preventing, non-adjustable or fixed-length/height sleeves designed and constructed in accordance with one or more aspects of the present disclosure, and underground utility boxes and related methods, would benefit any industry that utilizes underground utility boxes such as, for example, valve boxes, curb boxes, service boxes, and test stations, including, for example, the gas, ground water, waste water, sewer, corrosion and electric industries. Thereby, the present disclosure provides underground utility boxes and methods of making/manufacturing, providing and installing such boxes, that incorporate or include a no slip, shortening prevention/preventing, non-adjustable or fixed-length/height sleeve.

Figure 1:
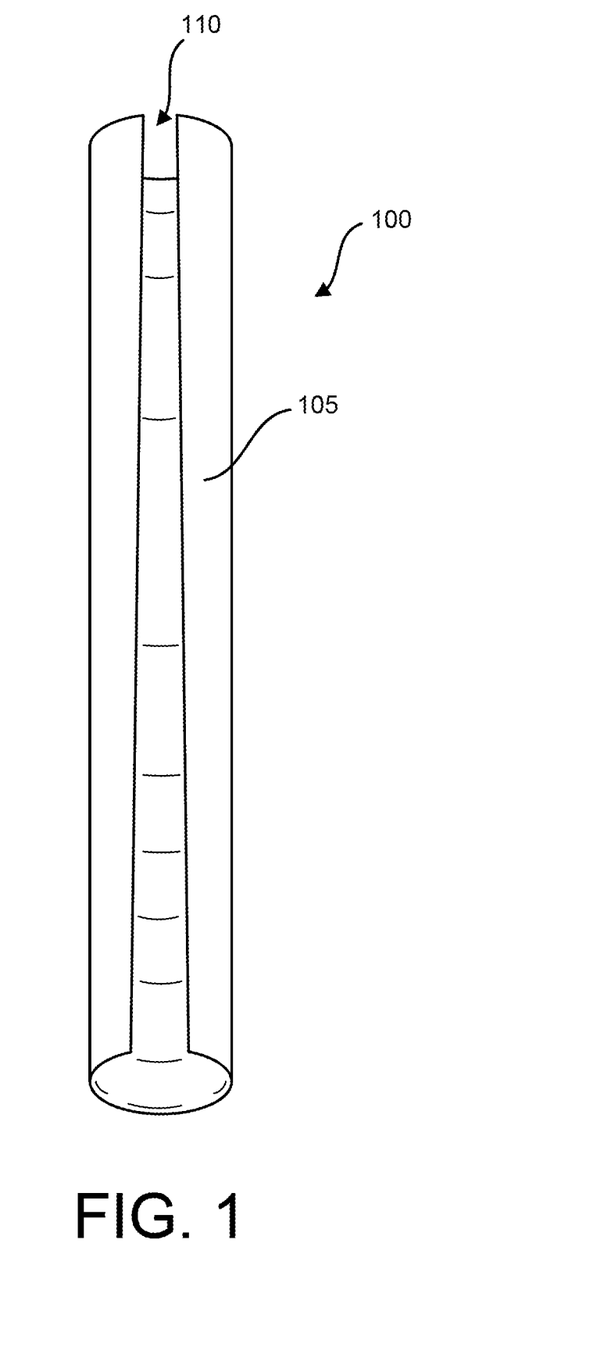
FIG. 1 depicts a perspective view of an exemplary embodiment of an underground utility box sleeve constructed in accordance with one or more aspects of the present disclosure.
Figure 2:
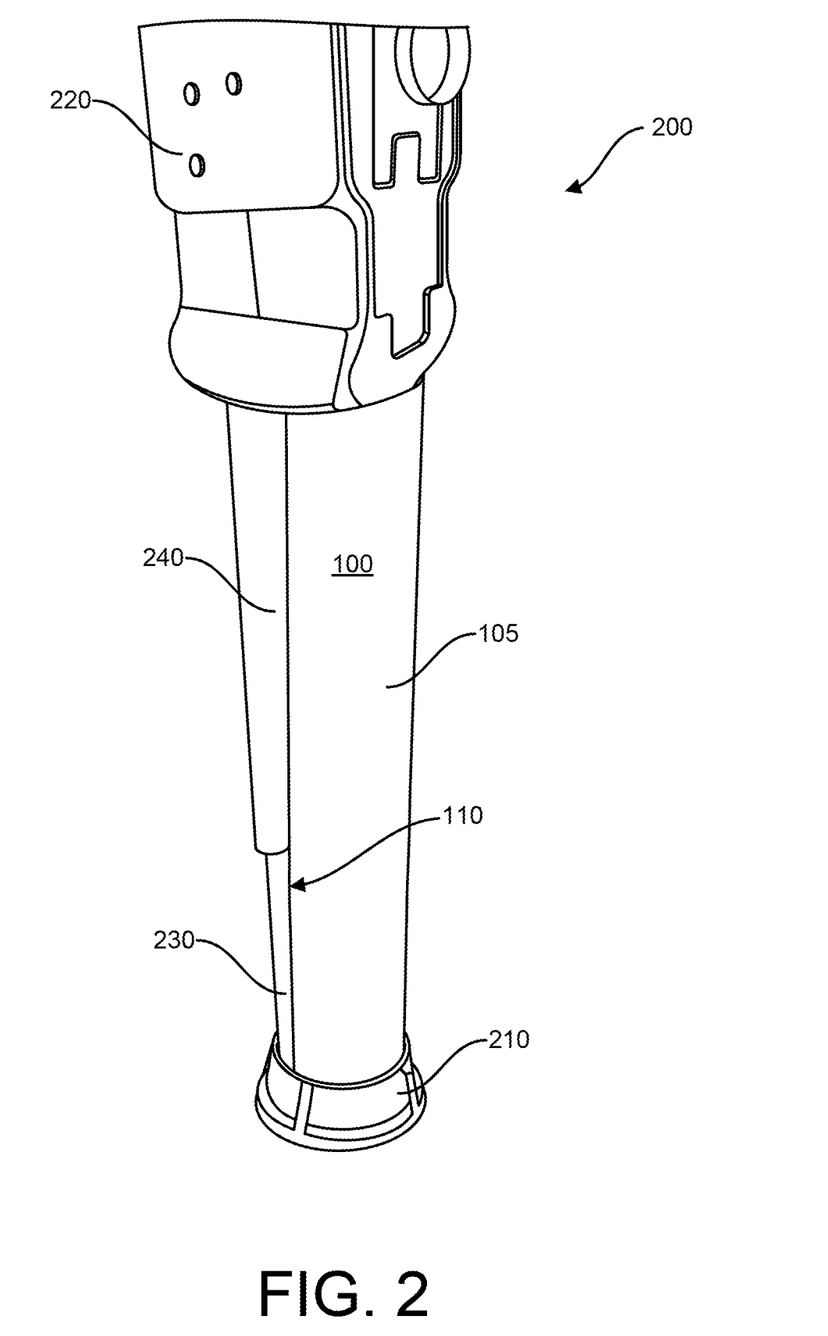
FIG. 2 depicts a perspective view of an exemplary embodiment of an underground utility box with the sleeve of FIG. 1 being installed in accordance with one or more aspects of the present invention installed on a valve box.

FIG. 1 depicts one embodiment of a no slip, shortening prevention/preventing, non-adjustable or fixed-length/ height sleeve 100 constructed in accordance with one or more aspects of the present disclosure. As illustrated in FIG. 1, no slip, shortening prevention/preventing, non-adjustable or fixed-length/height sleeve 100 includes an elongated hollow cylindrical tube 105. The tube 105 is formed of a relatively thin wall that extends about an axis to form an internal space, cavity or void (e.g., a cylindrical void) extending therein. As shown in FIGS. 1 and 2, the internal cavity may be open or accessible at opposing ends or sides of the tube 105. In this way, the internal cavity may extend fully through the tube 105 along the height/length direction.

Figure 3:
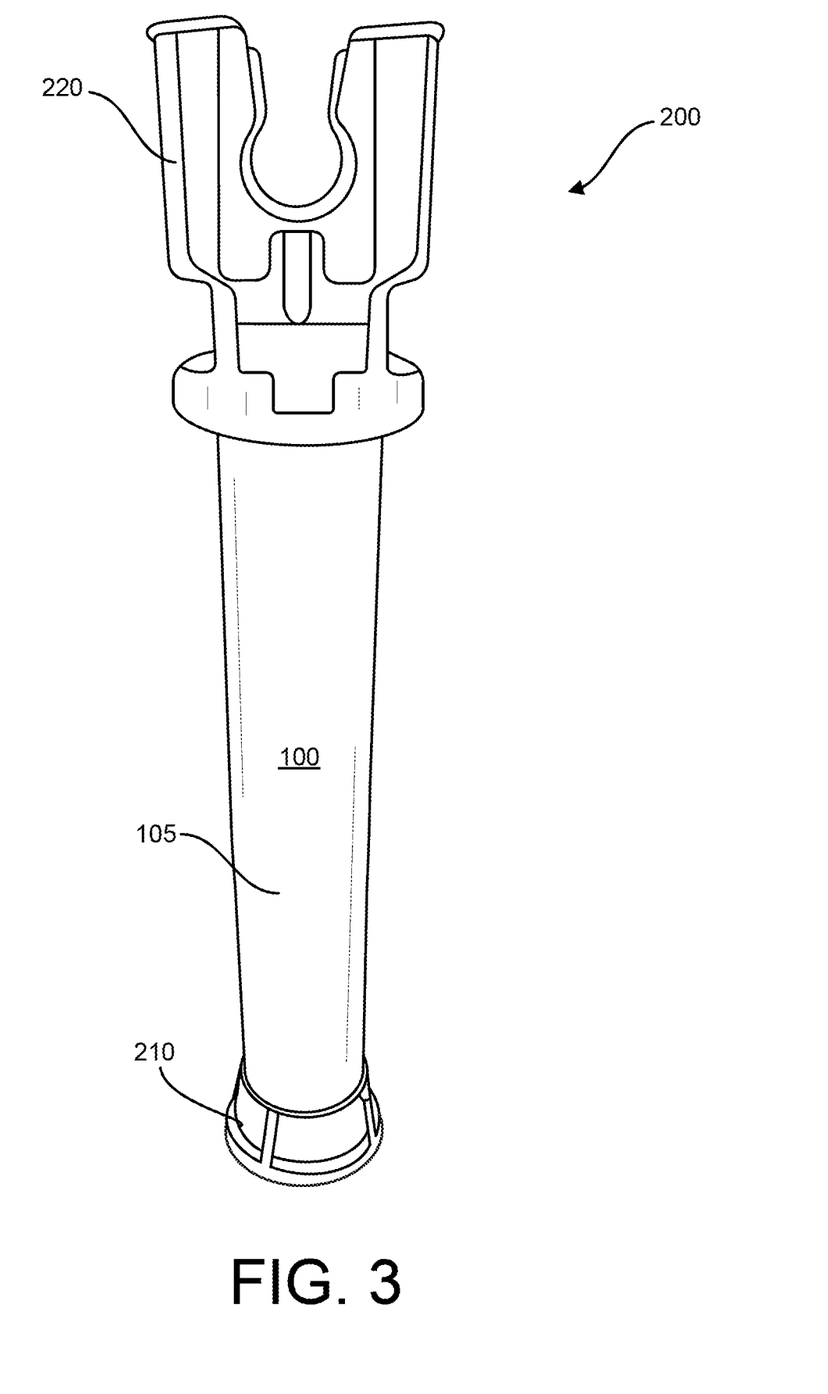
FIG. 3 depicts a perspective view of an exemplary embodiment of an underground utility box with the sleeve of FIG. 1 in accordance with one or more aspects of the present invention installed on a valve box.

As also shown in FIG. 1, the tube 105 comprises a longitudinal slit or space 110 extending the entire length or height of the tube 105 that provides an opening to the internal cavity. The slit, space or opening 110 allows the sleeve 100 to fit around any existing stems of an underground utility box 200, such as for example a valve box. The underground utility box 200 may be substantially similar to the underground utility boxes 300 described above with respect to FIG. 4. For example, as shown in FIGS. 2 and 3, the sleeve 100 may be applied to stems of an underground utility box 200 by passing stem portions 230, 240 of the underground valve box 200 through the opening 110 such that they extend through the internal cavity. In some embodiments, the opening 110 may be sized and configured such that the stem portions 230, 240 can freely extend or pass through the opening 110 into the internal cavity (when aligned there-along or therewith). In some other embodiments, the opening 110 may be sized and configured such that the stem portions 230, 240 cannot freely extend or pass the opening 110 into the internal cavity (when aligned there-along or therewith). For example, the opening 110 may be sized and configured such that the tube 105 must be deformed (e.g., elastically or plastically) to expand the opening such that the stem portions 230, 240 extend or pass the opening 110 into the internal cavity (when aligned there-along or therewith). In such embodiments, the tube 105 may thereby be deformable (elastically and/or plastically) in a width, radial, angular or circumferential direction to allow the size of the opening 110 to increase (along such a direction) to allow the stem portions 230, 240 to pass therethrough. In some embodiments, after insertion of the stem portions 230, 240 through the opening 110 such that they are housed within the internal cavity, the tube 105 may elastically deform such that the opening 110 is sized and configured to prevent the stem portions 230, 240 from freely passing though the opening 110. Thereby, in some embodiments the sleeve 100 may be configured to maintain the stem portions 230, 240 within the internal cavity.

As shown in FIGS. 2-3, the sleeve 100 may be positioned over an upper or first stem 230 that extends from the top portion 210 and a lower or second stem 240 that extends from the bottom portion 220 of a valve box an underground utility box 200 (e.g., a valve box). As shown, the sleeve 100 may thereby extend over the first and second sleeves 230, 240 and between the upper portion 210 and the lower portion 220. As shown in FIGS. 2 and 3, the maximum diameter or width of the top portion 210 and the lower bottom portion 220 may be greater than that of the internal cavity of the tube 105. The tube 105 (and thereby the sleeve 100) may be substantially stiff/rigid and strong in the height/length direction (e.g., configured to resist deformation along the height/ length direction under loads experienced in underground utility box applications) such that it prevents the top portion 210 and the lower bottom portion 220 from moving (e.g., via the first and second stems 230, 240) towards each other along the height/length direction (i.e., prevent the relative distance therebetween from shortening). However, the sleeve 100 may allow the top portion 210 and the lower bottom portion 220 from moving (e.g., via the first and second stems 230, 240) away from each other along the height/length direction (i.e., allow the relative distance therebetween to enlarge). For example, the sleeve 100 may allow the top portion 210 and the first sleeve portion 230 (which may be integral or fixedly coupled) from translating along the height/length direction away from the bottom portion 220 and the second stem portion 240 (which may be integral or fixedly coupled), such as when the bottom portion 220 and the second stem portion 240 are positioned at least partially underground or not yet installed underground. In such an embodiment, the height/length of an underground utility box 200 may be modified by adjusting the relative distance (i.e., increasing or decreasing the distance) between the top portion 210 and the bottom portion 220 to a desired distance (e.g., to provide the valve box 200 with a total desired height/length) and installing the sleeve 100 configured to such a modified distance on the stem portions 230, 240 thereof and fully between the top portion 210 and the bottom portion 220. In some such embodiments, an existing sleeve 100 configured to a previous or existing distance may be removed prior to installing the sleeve 100 configured to the modified distance. Further, as described above, the tube 105 may be deformable in a width or like direction to allow the opening 110 to be manually enlarged.

The sleeve 100 thereby fixes the position or distance between the top portion 210 and the bottom portion 220 of the valve box 200, and thereby the total minimum length or height of the valve box 200. The length or height of the sleeve 100 may be sized to accommodate a variety of lengths and diameters of utility boxes 200. In one example, the sleeve 100 may be made of flexible PVC material. By using a flexible PVC material or another plastic, composite or other relatively workable material(s), an installer is able to field cut the exact desired length for the particular application of the sleeve 100 in the field during installation (e.g., to form an underground utility box 200 of a length/height that extends from the bottom portion 220 position underground proximate to an underground structure to the upper portion 210 positioned even with or proximate to a top surface or grade of the ground).

As previously discussed, the distance between the top 210 and bottom 220 portions of an underground utility box 200 (for example, a valve box) is initially determined during installation based on the distance between, for example, an underground pipe, valve or other structure and ground or grade level. An installer may thereby adjust the distance between the top 210 and bottom portions 220 in the field by using the adjustable mechanism or configuration (e.g. screw or slip adjustment) between the mating first and second stem portions 230, 240 associated therewith. As previously explained, over time, slippage may occur between the stem portions 230, 240 resulting in sinking or other issues with the underground utility box 200 (which may cause a depression at grade level of the ground and/or cause the top end 210 to become buried below grade). Further, as also explained above, the underground utility box 200 as a whole may sink or otherwise translate deeper into the ground than original installed (which may cause a depression at grade level of the ground and/or cause the top end 210 to become buried below grade). The sleeve 100 constructed in accordance with one or more aspects of the present disclosure prevents, for example, the top portion 220 of an adjustable underground utility box 200 (e.g. an underground valve box or test station) from slipping or otherwise translating below its original depth or location in the ground when it was installed. Further, the sleeve 100 constructed in accordance with one or more aspects of the present disclosure allows, for example, the top portion 220 of an adjustable underground utility box 200 (e.g. an underground valve box or test station) to be raised and reset at a defined height or location that is prevented from slipping or otherwise translating below its modified depth or location in the ground when it was installed.

In some embodiments, multiple sleeves 100 may be utilized. For example, a plurality of stacked or adjacent sleeves 100 may be utilized to increase the height/length of an adjustable underground utility box 200 and/or prevent an adjustable underground utility box 200 from deceasing in height/length (pre- and post-installation). In some such embodiments, adjacent sleeves 100 may include differing cross-sectional shapes and/or lips or rims that prevent such adjacent sleeves 100 from becoming nested in/about each other.

A sleeve 100, and an underground utility box including a sleeve 100, constructed in accordance with one or more aspects of the present disclosure also provides for the installation of an underground utility box in any application much less time consuming by, for example, allowing an installer to lock or fix a preferred or predetermined bury depth or location of the top portion 210 of the box 200 in place prior to installation into the ground. This allows the installation to be an easy one step operation. In this regard, the bottom piece 220 of, for example, a underground utility box 200, does not have to be first set over or proximate to the buried valve or other underground structure as the first step of the installation. With the sleeve 100 constructed in accordance with one or more aspects of the present disclosure, the bury depth (e.g. distance between ground level and the underground structure) can be determined prior to installing the box 200 in the ground, and the stem portions 230, 240 can be adjusted accordingly to an appropriate length to provide the desired distance between the top 210 and bottom portions 220 to provide the overall desired height. The sleeve 100 can then be installed (e.g. snapped on) over the stem portions 230, 240 of the box 200 to lock or fix the predetermined distance between the top 210 and bottom portions 220 and the overall height/length of the box 200. The box 200 as a whole, configured at the predetermined height and prevented from shortening via the sleeve 100, may then be installed in the ground (i.e., at least partially underground) and in association (e.g., over) the underground structure, such as to protect the underground protected structure from corrosion and/or provide access to the underground structure.

The use of the sleeve 100 constructed in accordance with one or more aspects of the present disclosure thereby provides an installer with a more precise, quicker and safer installation process by, for example, eliminating any awkward or cumbersome slippage (i.e., accidental or unwanted change in height/length) of the underground utility box 200 during installation. When the time for installation arrives, the box 200 can be installed as one piece. This lessens the chances of dropping, breaking or even injury during assembly and installation.

A sleeve 100 constructed in accordance with one or more aspects of the present disclosure also enables an installer to adjust the height/length of an underground utility box 200 (e.g., via telescoping tube or stem portions 230, 240) to a height/length, and then utilize the sleeve 100 between the bottom 220 and top 210 end portions (e.g., as a wrap around the outside shaft or stems 230, 240 of the box 200) to ensure that both the specified bury depth of the top portion 210 is maintained while also maintaining/increasing the overall integrity and life of the box 200. Further, by preassembling the underground valve box 200 with the sleeve 100 constructed in accordance with one or more aspects of the present disclosure as one complete unit (e.g. as illustrated in FIGS. 2-3) in the desired fixed height/length, an installer can easily install the box 200 underground with/to the underground structure in a less clumsy and easier installation process that reduces mistakes (e.g., incorrect box height/length and/or location/depth of the top portion or end 210 of the box). Further, such an installation process also enables the installer to install the box 200 underground with respect to the underground structure while remaining above ground.

Still further, a sleeve 100 constructed in accordance with one or more aspects of the present disclosure may prevent any excess dirt or debris from entering into the adjustable stem portions 230, 240 of an adjustable underground utility box. For example, when dirt or debris enters into such an adjustable underground utility box, it can interfere with the height/length adjustment mechanism or configuration (e.g., prevent operation of a slip type adjustment mechanism or a threaded type adjustment mechanism). Such dirt/debris therefore must be removed from the adjustment mechanism in such adjustable underground utility boxes, and thereby potentially requiring an assembly and/or installation process from being repeated and/or redone.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to define the parameters of the disclosure, they are by no means limiting and are exemplary embodiments. Many other embodiments will be apparent to those of ordinary skill in the art upon reviewing the above description. The scope of the disclosure should, therefore, be determined with reference to the appended claims, along with the full scope of equivalents to which such claims are entitled.

In the appended description, the terms "including" and "in which" are used as the plain-English equivalents of the respective terms "comprising" and "wherein." Moreover, in the following claims, the terms "first," "second," etc. if any, are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the disclosure, including the best mode, and also to enable any person of ordinary skill in the art to practice the embodiments of disclosure, including making and using any devices or systems and performing any incorporated methods. The patentable scope of the disclosure is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

All publications cited in this specification are herein incorporated by reference as if each individual publication were specifically and individually indicated to be incorporated by reference herein as though fully set forth. Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

I claim:

1. A system, comprising:
    an underground utility box comprising a top portion, a bottom portion and a length-adjustable stem portion extending between the top and bottom portions configured to adjust the distance between top and bottom portions, the top and bottom portions each defining a width greater than a maximum width of the stem portion; and
    a substantially rigid sleeve of a fixed non-adjustable length at least partially surrounding the stem portion and extending fully between and engaging surfaces of the top and bottom portions of the utility box to prevent the stem portion from shortening and thereby shortening the distance between the top and bottom portions.

2. The system of claim 1, wherein the sleeve comprises an elongate tube member that defines an internal cavity that extends through the tube, and wherein the stem portion is positioned within the internal cavity.

3. The system of claim 2, wherein the internal cavity defines a minimum width that is greater than the maximum width of the stem portion.

4. The system of claim 2, wherein the sleeve comprises an opening that extends along the entirety of the length of the tube member.

5. The system of claim 1, wherein the sleeve comprises an opening that extends along the entirety of the length of the tube member.

6. The system of claim 5, wherein a minimum width of the opening is less than the maximum width of the stem portion.

7. The system of claim 6, wherein the sleeve is configured to be manually deformable to widen the opening to a width that is equal to or greater than the width of the stem portion.

8. The system of claim 5, wherein a minimum width of the opening is equal to or greater than a width of the stem portion.

9. The system of claim 1, wherein the sleeve is configured to allow the stem portion to lengthen the distance between the top and bottom portions.

10. The system of claim 1, wherein the top portion, the stem portion and the bottom portion of the utility box form an internal passageway that extends through the entirety thereof.

11. The system of claim 1, wherein the stem portion of the utility box comprises an adjustable connection that is configured to provide for shortening and lengthening of the stem portion.

12. The system of claim 1, wherein the stem portion of the utility box comprises a first stem portion extending from the top portion of the utility box and a second stem portion extending from the bottom portion of the utility box, the first and second stem portions being telescopingly arranged.

13. The system of claim 1, wherein the sleeve is an integral one-piece member.

14. The system of claim 1, wherein the sleeve comprises a one-piece elongate tube member that defines an internal cavity that extends through the tube, the stem being positioned within the internal cavity, wherein the sleeve comprises an opening that extends along the entirety of the length of the tube member in communication with the internal cavity, and wherein the sleeve is configured to allow the stem portion to lengthen the distance between the top and bottom portions.

15. The system of claim 14, wherein a minimum width of the opening is less than the maximum width of the stem portion.

16. The system of claim 14, wherein the top portion, the stem portion and the bottom portion of the utility box form an internal passageway that extends through the entirety thereof, and wherein the stem portion of the utility box comprises an adjustable connection that is configured to provide for shortening and lengthening of the stem portion.

17. The system of claim 1, wherein the sleeve is configured such that when the bottom portion of the utility box is positioned at an underground structure, the top portion is positioned at a top surface of the ground.

18. The system of claim 17, wherein the utility box is installed underground with the bottom portion positioned at the underground structure and the top portion positioned at the top surface of the ground.

19. The system of claim 1, wherein the sleeve is coupled to the stem portion of the underground utility box prior to installation of the utility box underground.

* * * * *